United States Patent
Chung et al.

(10) Patent No.: US 9,203,114 B2
(45) Date of Patent: Dec. 1, 2015

(54) ELECTROLYTE FOR MAGNESIUM SECONDARY BATTERY AND PREPARATION METHOD THEREOF

(71) Applicant: KOREA INSTITUTE OF SCIENCE AND TECHNOLOGY, Seoul (KR)

(72) Inventors: Kyung Yoon Chung, Seoul (KR); Byung Won Cho, Seoul (KR); Joong Kee Lee, Seoul (KR); Jae Hyun Cho, Seoul (KR); Sang Hoon Lee, Seoul (KR); Won Young Chang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 405 days.

(21) Appl. No.: 13/870,439

(22) Filed: Apr. 25, 2013

(65) Prior Publication Data
US 2014/0141324 A1    May 22, 2014

(30) Foreign Application Priority Data
Nov. 22, 2012 (KR) .......... 10-2012-0132935

(51) Int. Cl.
| H01M 6/04 | (2006.01) |
| H01M 10/26 | (2006.01) |
| H01M 10/0567 | (2010.01) |
| H01M 10/054 | (2010.01) |
| H01M 10/0568 | (2010.01) |

(52) U.S. Cl.
CPC ........ *H01M 10/0567* (2013.01); *H01M 10/054* (2013.01); *H01M 10/0568* (2013.01)

(58) Field of Classification Search
CPC .......... H01M 10/0568; H01M 10/054; H01M 10/0567
USPC ........................................ 429/200, 199, 207
See application file for complete search history.

(56) References Cited

U.S. PATENT DOCUMENTS

| 5,591,538 A | 1/1997 | Eidler et al. |
| 6,713,213 B2 | 3/2004 | Ito et al. |

FOREIGN PATENT DOCUMENTS

JP    2007-188709 A    7/2007

OTHER PUBLICATIONS

Ning Liu, et al; "Electrochemical Deposition of Magnesium in Ethereal Grignard Salt Solution with Ionic Liquid Additive", International Journal of Modern Physics B., vol. 23, Nos. 6 & 7, pp. 838-842; Mar. 20, 2009.*
Nobuko Yoshimoto, et al; "Mixed electrolyte consisting of ethylmagnesiumbromide with ionic liquid for rechargeable magnesium electrode", Journal of Power Sources, vol. 195, pp. 2096-2098; Available online Nov. 1, 2009.

* cited by examiner

*Primary Examiner* — William Cheung
(74) *Attorney, Agent, or Firm* — Ladas & Parry LLP

(57) ABSTRACT

Provided are an electrolyte for a magnesium secondary battery having improved ion conductivity and stability, and a method for preparing the same. The electrolyte for a magnesium secondary battery shows higher ion conductivity as compared to the electrolyte according to the related art, increases the dissociation degree of a magnesium halide electrolyte salt, and provides stable electrochemical characteristics. In addition, after determining the capacity, output characteristics and cycle life of the magnesium secondary battery including the electrolyte, the battery provides significantly higher discharge capacity after 100 cycles, as compared to the electrolyte according to the related art. Therefore, the electrolyte may be useful for an electrolyte solution of a magnesium secondary battery.

8 Claims, 1 Drawing Sheet

ELECTROLYTE FOR MAGNESIUM SECONDARY BATTERY AND PREPARATION METHOD THEREOF

CROSS-REFERENCE TO RELATED APPLICATIONS

This application claims priority under 35 U.S.C. §119 to Korean Patent Application No. 10-2012-0132935 filed on Nov. 22, 2012, in the Korean Intellectual Property Office, the disclosure of which is incorporated herein by reference in its entirety.

TECHNICAL FIELD

The following disclosure relates to an electrolyte for a magnesium secondary battery having improved ion conductivity and stability, and a method for preparing the same.

BACKGROUND

In general, magnesium having high energy density per unit mass and volume is a material with good prospects as an anode material for a battery. Particularly, since magnesium has a lot of resources and is handled with ease, a magnesium secondary battery has excellent safety and price competitiveness, and thus has been given many attentions as a middle- or large-size battery for electric power energy storage or for electric vehicles. Also, it is expected that such a battery realizes significant market expansion.

The theoretical energy density of a magnesium secondary battery is relatively high, while the theoretical energy density of a lithium secondary battery is the highest. However, realization of the characteristics of magnesium as a secondary battery has been disclosed first by T. Gregory et. al, in 1990. Any studies about magnesium batteries have not been conducted for about 10 years since 1990. In the 2000s, BIU Group has developed Chevrel-phase cathode active materials ensuring reversibility. Due to this, magnesium batteries have been given many attentions as a substitute capable of solving the problems of safety and cost related with lithium secondary batteries. However, the energy density of magnesium secondary batteries that have been developed to date is merely about ½ or less of that of lithium secondary batteries. Under these circumstances, there is an imminent need for a novel cathode active material, electrolyte solution, collector, or the like.

Particularly, there are many problems to be solved, including precipitation at an anode, reversible dissolution, establishing a cathode process, improving diffusion rate of $Mg^{2+}$ ions in a solid phase, or the like. The key solving those problems consists in developing a novel electrolyte material system applicable to both a cathode and an anode.

Recent studies are mainly focused on cathode active materials and electrolyte solutions. Referring to cathode active materials, metal sulfur compounds, organosulfur compounds, metal oxides, metal silicate compounds, etc. have been studied to increase the reversible capacity per unit weight and to improve the reversibility, but are not successful. In the state of art, Chevrel-phase, $Mo_6S_8$ cathode active materials provide a battery with quality amenable to commercialization.

Referring to electrolyte solutions, Grignard solutions showing magnesium anode reversibility has been studied intensively. Recently, it has been reported that magnesium aluminate shows high quality. However, until now, such Grignard electrolyte solutions in which magnesium is precipitated and dissolved reversibly are not applied to a cathode process due to the high reducing capability thereof. On the contrary, it is difficult to carry out precipitation and dissolution of anode magnesium metal reversibly, in an organic solvent-based electrolyte solutions to/from which $Mg^{2+}$ ions are intercalated/deintercalated at a cathode active material.

According to the related art (U.S. Pat. No. 6,713,213 published on Jun. 21, 2001, Matsushita Electric Industrial Company), a non-aqueous electrolyte magnesium secondary battery is disclosed, and the battery uses a halogen-containing organomagnesium compound represented by the formula of RMgX as non-aqueous electrolyte, and includes a rechargeable cathode, non-aqueous electrolyte and an anode. In addition, Japanese Laid-Open Patent Publication No. 2007-188709 (Sony Company, Jan. 12, 2006) discloses an electrochemical device having a first electrode, a second electrode and an electrolyte, wherein the active material of the second electrode is designed to be oxidized to produce magnesium ions, and the electrolyte is a composition of Grignard reagent RMgX (wherein R is an alkyl or aryl group, and X is fluorine, chlorine or bromine) with an organometallic compound or salt other than magnesium salts.

However, the above-mentioned electrolytes according to the related art show low ion conductivity and provide a battery with a low charge/discharge rate, and thus has a limitation in battery quality. Therefore, it is necessary to improve an electrolyte in order to develop a magnesium secondary battery having a competitive advantage as compared to the secondary batteries according to the related art.

SUMMARY

An embodiment of the present disclosure is directed to providing a novel electrolyte for a magnesium secondary battery having high ion conductivity.

Another embodiment of the present disclosure is directed to providing a method for preparing the electrolyte for a magnesium secondary battery.

Still another embodiment of the present disclosure is directed to providing a magnesium secondary battery including the novel electrolyte for a magnesium secondary battery having high ion conductivity.

In one general aspect, there is provided an electrolyte for a magnesium secondary battery, including a composition represented by the following Chemical Formula 1:

[Chemical Formula 1]

wherein $R^1$, $R^2$, $X^1$ and $X^2$ are the same as defined hereinafter.

In another general aspect, there is provided a method for preparing the electrolyte for a magnesium secondary battery.

In still another general aspect, there is provided a magnesium secondary battery including the electrolyte for a magnesium secondary battery.

The electrolyte for a magnesium secondary battery disclosed herein has higher ion conductivity as compared to the electrolyte according to the related art, improves the dissociation degree of the magnesium halide electrolyte salt according to the related art, and shows stable electrochemical characteristics. In addition, after determining the capacity, output characteristics and cycle life of the magnesium secondary battery including the electrolyte disclosed herein, the battery provides significantly higher discharge capacity after 100 cycles as compared to the electrolyte according to the related art. As a result, the electrolyte disclosed herein may be useful for an electrolyte solution of a magnesium secondary battery.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF EMBODIMENTS

Figure 1:
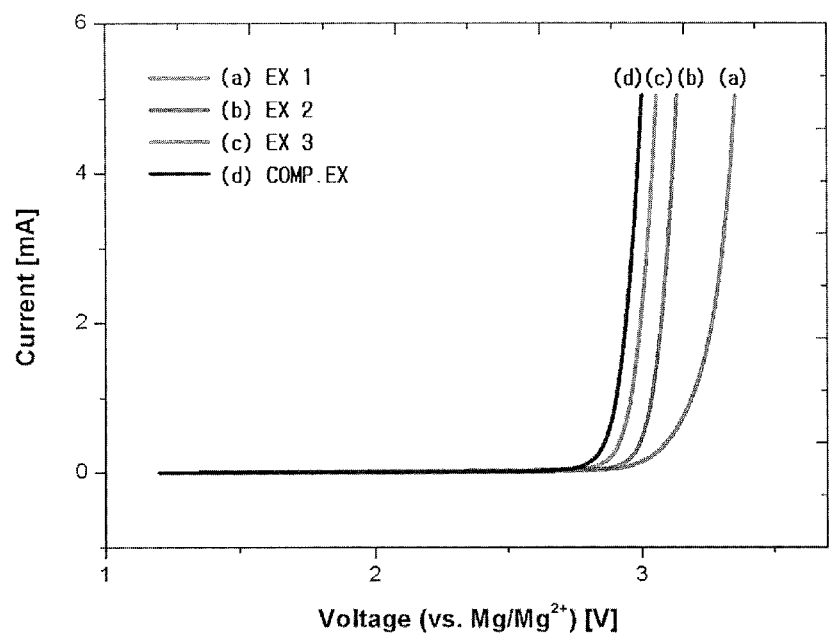
FIG. 1 is a graph illustrating the electrochemical stability of Example and that of Comparative Example.

The advantages, features and aspects of the present disclosure will become apparent from the following description of the embodiments with reference to the accompanying drawings, which is set forth hereinafter.

In one aspect, there is provided an electrolyte for a magnesium secondary battery, including a composition represented by the following Chemical Formula 1:

[Chemical Formula 1]

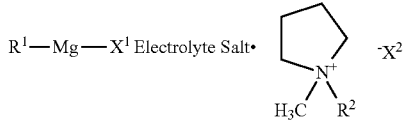

$R^1$—Mg—$X^1$ Electrolyte Salt• wherein each of $R^1$ and $R^2$ independently represents any one selected from the group consisting of a $C_1$-$C_{10}$ linear or branched alkyl group, $C_5$-$C_{12}$ cycloalkyl group, $C_5$-$C_{12}$ aryl group and allyl group, which are non-substituted or substituted with a $C_1$-$C_{10}$ linear or branched alkoxy group; and each of $X^1$ and $X^2$ independently represents any one selected from the group consisting of a halogen atom, non-substituted or fluoroalkyl group-substituted sulfonimide, and non-substituted or fluoroalkyl group-substituted sulfonamide.

Particularly, each of $R^1$ and $R^2$ independently represents any one selected from the group consisting of methyl, ethyl, propyl, isopropyl, butyl, isobutyl, 2-[2-(2-methoxy-ethoxy)-ethoxy]-ethyl, cyclopentane, cyclohexane and phenyl; and each of $X^1$ and $X^2$ independently represents —Cl, —Br or —I.

More particularly, the $R^1$—Mg—$X^1$ electrolyte salt is any one selected from the group consisting of ethyl magnesium bromide (EtMgBr), ethyl magnesium chloride (EtMgCl), All-Ethyl Complex (AEC, EtMgCl-(EtAlCl$_2$)$_2$ Complex), and All-Phenyl Complex (APC, PhMgCl—AlCl$_3$ Complex).

In addition,

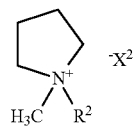

represents at least one ionic liquid selected from the group consisting of N-allyl-N-methylpyrrolidinium chloride (AMPCl), N-allyl-N-methylpyrrolidinium bromide (AMPBr), N-allyl-N-methylpyrrolidinium bis(trifluoromethane)sulfonamide (AMPTFSI), N-butyl-N-methylpyrrolidinium bromide (BMPBr), N-butyl-N-methylpyrrolidinium chloride (BMPCl), 1-{2-[2-(2-methoxy-ethoxy)-ethoxy]-ethyl}-1-methyl-pyrrolidinium bromide (TEGMPBr) and 1-{2-[2-(2-methoxy-ethoxy)-ethoxy]-ethyl}-1-methyl-pyrrolidinium chloride (TEGMPCl).

The electrolyte for a magnesium secondary battery disclosed herein includes:

1-20 wt % of the $R^1$—Mg—$X^1$ electrolyte salt; and
0.1-10 wt % of a compound represented by the formula of

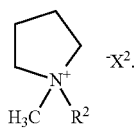

When the electrolyte has a composition beyond the above-defined range, particularly when the $R^1$—Mg—$X^1$ electrolyte salt is used in an amount less than 1 wt %, ion conductivity is too low due to such a low ion concentration. Thus, the electrolyte provides a battery with a low charge/discharge rate and high resistance. When the $R^1$—Mg—$X^1$ electrolyte salt is used in an amount more than 20 wt %, a non-dissolved electrolyte salt is formed due to a low dissociation degree of electrolyte salt. Thus, the electrolyte provides a battery with increased resistance and causes a problem of short-circuit due to the presence of solid.

In addition, when the ionic liquid is used in an amount less than 0.1 wt % in the electrolyte for a magnesium secondary battery, ion conductivity is too low due to an insufficient increase in dissociation degree of the electrolyte salt. On the other hand, when the ionic liquid is used in an amount more than 10 wt %, the ionic liquid is not dissolved but is present as solid. Thus, the electrolyte provides a battery with increased resistance and causes a problem of short-circuit. Therefore, it is difficult to apply such electrolyte to a magnesium secondary battery.

In another aspect, there is provided a method for preparing an electrolyte for a magnesium secondary battery, including the steps of:

(a) dissolving $R^1$—Mg—$X^1$ electrolyte salt (wherein each of $R^1$ and $X^1$ is the same as defined in Chemical Formula 1 of claim 1) into a solvent to provide a magnesium halide solution;

(b) dissolving a compound represented by the formula of

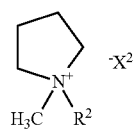

(wherein each of $R^2$ and $X^2$ is the same as defined in Chemical Formula 1 of claim 1) into a solvent to provide an additive solution; and (c) adding the additive solution obtained from step (b) to the magnesium halide solution of step (a), followed by mixing, to provide an electrolyte for a magnesium secondary battery.

In the method disclosed herein, step (a) includes dissolving a magnesium halide electrolyte salt ($R^1$—Mg—$X^1$) into a solvent to provide a magnesium halide solution.

Herein, the magnesium halide electrolyte salt, i.e., $R^1$—Mg—$X^1$ electrolyte salt that may be used is any one selected from the group consisting of ethyl magnesium bromide (EtMgBr), ethyl magnesium chloride (EtMgCl), All-Ethyl Complex (AEC, EtMgCl-(EtAlCl$_2$)$_2$ Complex), All-Phenyl Complex (APC, PhMgCl—AlCl$_3$ Complex). More particularly, the electrolyte salt is All-Ethyl Complex or All-Phenyl Complex.

Particularly, since All-Ethyl Complex or All-Phenyl Complex has higher thermal stability and lower reactivity with water as compared to ethyl magnesium bromide or ethyl magnesium chloride, use of All-Ethyl Complex or All-Phenyl Complex is advantageous in that the stability of a magnesium secondary battery is maintained.

In addition, the solvent into which the electrolyte salt is to be dissolved may be at least one selected from the group consisting of tetrahydrofuran (THF), dioxane, anisole, Crown ether, polyethylene glycol, acetonitrile, propylene carbonate and a combination thereof. Particularly, tetrahydrofuran is used to dissolve the electrolyte salt therein.

Further, in the method disclosed herein, step (b) includes dissolving a compound represented by the formula of

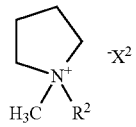

into a solvent to provide an additive solution.

In step (b), the compound represented by the formula of

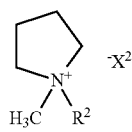

is at least one ionic liquid selected from the group consisting of N-allyl0N-methylpyrrolidinium chloride (AMPCl), N-allyl-N-methylpyrrolidinium bromide (AMPBr), N-allyl-N-methylpyrrolidinium bis(trifluoromethane) sulfonamide (AMPTFSI), N-butyl-N-methylpyrrolidinium bromide (BMPBr), N-butyl-N-methylpyrrolidinium chloride (BMPCl), 1-{2-[2-(2-methoxy-ethoxy)-ethoxy]-ethyl}-1-methyl-pyrrolidinium bromide (TEGMPBr) and 1-{2-[2-(2-methoxy-ethoxy)-ethoxy]-ethyl}-1-methyl-pyrrolidinium chloride (TEGMPCl).

Such an ionic liquid is used as a material capable of improving magnesium ion conductivity and increasing the dissociation degree of a magnesium halide electrolyte salt.

In addition, the solvent into which the ionic liquid is to be dissolved may be at least one selected from the group consisting of tetrahydrofuran (THF), dioxane, anisole, Crown ether, polyethylene glycol, acetonitrile, propylene carbonate and a combination thereof. Particularly, tetrahydrofuran is used to dissolve the ionic liquid therein.

Further, in the method disclosed herein, step (c) includes adding the additive solution obtained from step (b) to the magnesium halide solution of step (a), followed by mixing, to provide an electrolyte for a magnesium secondary battery.

Herein, the $R^1$—Mg—$X^1$ electrolyte salt obtained from step (a) is added in an amount of 1-20 wt %, while the ionic liquid obtained from step (b) is added in an amount of 0.1-10 wt %, in the composition.

Thus prepared electrolyte has improved ion conductivity as compared to the electrolyte for a magnesium secondary battery according to the related art, increases the dissociation degree of a magnesium halide electrolyte salt (see, Test Example 1). In addition, after determining the electrochemical stability of the battery using the electrolyte, the battery shows stable electrochemical characteristics in a range of 0-3.0V (vs. Mg/Mg$^{2+}$) (see, Test Example 2). Therefore, the electrolyte disclosed herein may be useful as an electrolyte for a magnesium secondary battery.

In still another aspect, there is provided a magnesium secondary battery including, as an electrolyte, the electrolyte for a magnesium secondary battery represented by the following Chemical Formula 1:

[Chemical Formula 1]

wherein $R^1$, $R^2$, $X^1$ and $X^2$ are the same as defined hereinafter.

The lithium secondary battery according to the related art is problematic in terms of its safety due to the side reactions of an electrolyte solution and high reactivity of lithium. In addition, resources of lithium element are not abundant and lithium is expensive. Particularly, such problems related to safety and cost of a lithium secondary battery become a more important consideration, as middle- or large-scale batteries are increasingly in demand recently. Thus, use of a lithium secondary battery as a middle- or large-scale battery is limited.

To solve the above-mentioned problems, a magnesium secondary battery using magnesium as an electrode active material has been suggested recently as a substitute for a lithium secondary battery. More particularly, a magnesium secondary battery uses a magnesium plate as an anode, and is capable of charge/discharge while magnesium ions are intercalated/deintercalated to/from a cathode active material with electron transfer. Although magnesium has a theoretical capacity density similar to the theoretical capacity density of lithium, it is eco-friendly and cheaper than lithium, and provides a battery with higher safety as compared to lithium. Thus, many attentions have been given to a magnesium secondary battery as a substitute for a lithium secondary battery.

Such magnesium secondary batteries have been studied to date mainly about Grignard Solutions as magnesium halide electrolyte showing magnesium anode reversibility. However, even the above-mentioned electrolyte has low ion conductivity and provides a battery with a low charge/discharge rate and limited quality. Therefore, it is necessary to improve the electrolyte in order to develop a magnesium secondary battery having a competitive advantage as compared to the secondary batteries according to the related art.

After determining the ion conductivity of the electrolyte for a magnesium secondary battery disclosed herein, it is observed that ion conductivity is improved and the dissociation degree of a magnesium halide electrolyte is increased (see, Test Example 1). In addition, after determining the electrochemical stability of the battery using the electrolyte, the battery shows stable electrochemical characteristics in a range of 0-3.0V (vs. Mg/Mg$^{2+}$) (see, Test Example 2). Further, after determining the capacity, output characteristics and cycle life of the magnesium secondary battery including the electrolyte disclosed herein, the battery provides significantly higher discharge capacity after 100 cycles, as compared to the electrolyte according to the related art. As a result, the electrolyte disclosed herein may be useful for an electrolyte solution of a magnesium secondary battery.

EXAMPLES

The examples and experiments will now be described. The following examples and experiments are for illustrative purposes only and not intended to limit the scope of this disclosure.

Example 1

Preparation of APC-AMPCl Mixed Solution

First, 0.04M of (PhMgCl)$_2$—AlCl$_3$ complex (All-Phenyl Complex, APC) is dissolved into 100 ml of THF as a solvent to form 0.4M APC solution. Next, 10 g of N-allyl-N-methylpyrrolidinium chloride (AMPCl) ionic liquid is dissolved into 100 ml of THF as a solvent to form 10% AMPCl solution. To 10 ml of 0.4M APC solution, 10 ml of AMPCl solution is added to obtain 0.4M APC-1% AMPCl solution in which 1% AMPCl is dissolved.

Example 2

Preparation of APC-BMPBr Mixed Solution

Example 1 is repeated to obtain 0.4M APC-1% BMPBr solution, except that N-butyl-N-pyrrolidinium bromide (BMPBr) ionic liquid is used instead of AMPCl (N-allyl-N-methylpyrrolidinium chloride).

Example 3

Preparation of APC-TEGMPBr Mixed Solution

Example 1 is repeated to obtain 0.4M APC-1% TEGMPBr solution, except that TEGMPBr (1-{2-[2-(2-methoxy-ethoxy)-ethoxy]ethyl}-1-methylpyrrolidinium bromide) ionic liquid is used instead of AMPCl (N-allyl-N-methylpyrrolidinium chloride).

Comparative Example 1

Preparation of APC Solution 0.04M of electrolyte, (PhMgCl)$_2$—AlCl$_3$ double salt, is dissolved into 100 ml of THF as a solvent according to the related art to obtain 0.4M APC solution.

Test Example 1

Determination of Ion Conductivity

The ion conductivity of each of Examples 1-3 is determined and the results are shown in the following Table 1.

TABLE 1

|  | Ion conductivity (mS/cm) |
| --- | --- |
| Example 1 | 7.39 |
| Example 2 | 7.32 |
| Example 3 | 6.14 |
| Comparative Example 1 | 4.00 |

As shown in Table 1, the electrolyte solutions according to Examples 1-3 have an ion conductivity of 6.14-7.39 (mS/cm) in a normal operation temperature range. Thus, it can be seen that the electrolyte solutions according to Examples 1-3 have higher ion conductivity as compared to Comparative example 1 (4.0 mS/cm).

It is determined that the electrolyte disclosed herein shows improved ion conductivity and increases the dissociation degree of magnesium halide (Grignard Solution). Thus, the electrolyte solution disclosed herein having such high ion conductivity may be used as an electrolyte for a magnesium secondary battery.

Test Example 2

Determination of Electrochemical Stability

To determine electrochemical stability by using a nickel electrode, PP separator and magnesium metal as a counter electrode, a magnesium half cell is formed and the electrolyte solution of each of Examples 1-4 is introduced thereto. Then, linear sweep voltammetry is used to determine electrochemical stability at a sweep rate of 10 mV/sec and the results are shown in FIG. 1.

Results

As shown in FIG. 1, the electrolyte according to each of Examples 1-3 shows stable electrochemical characteristics in a range of 0-3.0V (vs. Mg/Mg$^{2+}$) as compared to the electrolyte of Comparative Example 1. It is thought that this is because the ionic liquid in each electrolyte mixed solution of Examples 1-3 is adsorbed onto the surface of an electrode, and thus functions as overvoltage in the electrochemical reaction occurring on the surface.

Therefore, the electrolyte solution disclosed herein shows higher ion conductivity as compared to the electrolyte according to the related art, increases the dissociation degree of a magnesium halide (Grignard Solution) electrolyte salt, and provides stable electrochemical characteristics. In addition, after determining the capacity, output characteristics and cycle life of the magnesium secondary battery including the electrolyte disclosed herein, the battery provides significantly higher discharge capacity after 100 cycles, as compared to the electrolyte according to the related art. As a result, the electrolyte disclosed herein may be useful for an electrolyte solution of a magnesium secondary battery.

Test Example 3

Determination of Quality of Magnesium Secondary Battery

To determine whether the magnesium secondary battery using each of the electrolytes of Examples 1-3 shows improvement in quality or not, a magnesium secondary battery including a magnesium anode, PP separator and $Mo_6S_8$ cathode is provided, and the charge/discharge voltage condition is set to 0.5V-1.8V. Then, the magnesium secondary battery is determined for capacity, output characteristics and cycle life. The results are shown in FIG. 2.

Results

Figure 2:
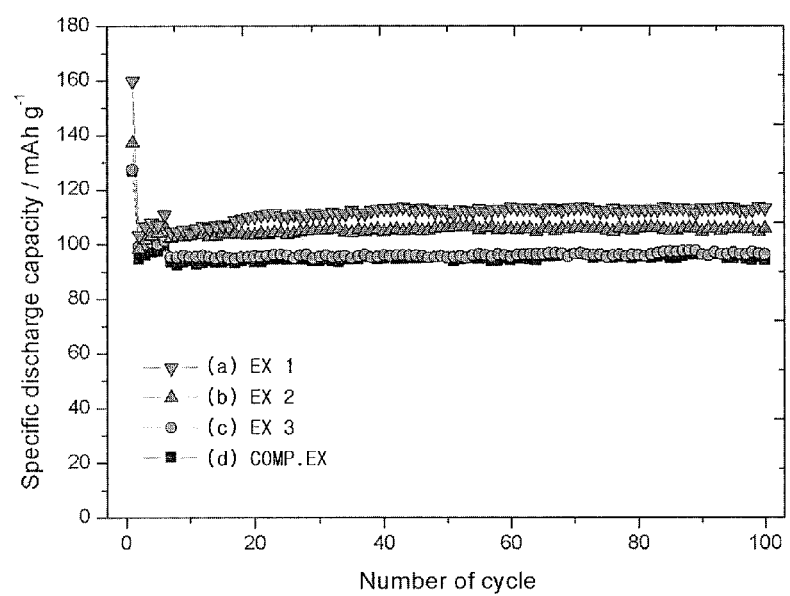
FIG. 2 is a graph illustrating the capacity, output characteristics and cycle life in each of the magnesium secondary batteries using the electrolyte solution of Example and that of Comparative Example.

As shown in FIG. 2, after determining the capacity, output characteristics and cycle life of the magnesium secondary battery including the electrolyte disclosed herein, the battery including the electrolyte of Example 1 provides, after 100 cycles, a specific discharge capacity per unit weight of 110 mAh/g, which is significantly higher as compared to the specific discharge capacity (92 mAh/g) of the electrolyte according to the related art.

Therefore, the electrolyte solution disclosed herein shows higher ion conductivity as compared to the electrolyte according to the related art, increases the dissociation degree of a magnesium halide (Grignard Solution) electrolyte salt, and provides stable electrochemical characteristics. In addition, after determining the capacity, output characteristics and cycle life of the magnesium secondary battery including the electrolyte disclosed herein, the battery provides significantly higher discharge capacity after 100 cycles, as compared to the electrolyte according to the related art. As a result, the electrolyte disclosed herein may be useful for an electrolyte solution of a magnesium secondary battery.

While the present disclosure has been described with respect to the specific embodiments, it will be apparent to those skilled in the art that various changes and modifications may be made without departing from the spirit and scope of the disclosure as defined in the following claims.

What is claimed is:

1. An electrolyte for a magnesium secondary battery, comprising a composition represented by the following Chemical Formula 1:

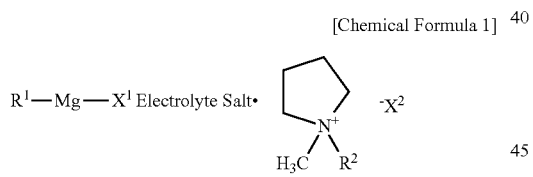
[Chemical Formula 1]

wherein $R^1$ is selected from the group consisting of a non-substituted $C_1$-$C_{10}$ linear or branched alkyl group or $C_1$-$C_{10}$ linear or branched alkyl group substituted with a $C_1$-$C_{10}$ linear or branched alkoxy group, non-substituted $C_5$-$C_{12}$ cycloalkyl group or $C_5$-$C_{12}$ cycloalkyl group substituted with a $C_1$-$C_{10}$ linear or branched alkoxy group, non-substituted $C_5$-$C_{12}$ aryl group or $C_5$-$C_{12}$ aryl group substituted with a $C_1$-$C_{10}$ linear or branched alkoxy group, and a non-substituted allyl group or allyl group substituted with a $C_1$-$C_{10}$ linear or branched alkoxy group;

$X^1$ is a halogen group;

$R^2$ is selected from the group consisting of a non-substituted $C_1$-$C_{10}$ linear or branched alkyl group or $C_1$-$C_{10}$ linear or branched alkyl group substituted with a $C_1$-$C_{10}$ linear or branched alkoxy group, non-substituted $C_5$-$C_{12}$ cycloalkyl group or $C_5$-$C_{12}$ cycloalkyl group substituted with a $C_1$-$C_{10}$ linear or branched alkoxy group, non-substituted $C_5$-$C_{12}$ aryl group or $C_5$-$C_{12}$ aryl group substituted with a $C_1$-$C_{10}$ linear or branched alkoxy group, and a non-substituted allyl group or allyl group substituted with a $C_1$-$C_{10}$ linear or branched alkoxy group; and $X^2$ is selected from the group consisting of a halogen group, non-substituted or fluoroalkyl group-substituted sulfonamide group, and a non-substituted or fluoroalkyl group-substituted sulfonamide group.

2. The electrolyte for a magnesium secondary battery according to claim 1, wherein the non-substituted $C_1$-$C_{10}$ linear or branched alkyl group or $C_1$-$C_{10}$ linear or branched alkyl group substituted with a $C_1$-$C_{10}$ linear or branched alkoxy group in $R^1$ is selected from the group consisting of methyl, ethyl, propyl, isopropyl, butyl, isobutyl, 2-[2-(2-methoxy-ethoxy)-ethoxy]-ethyl, cyclopentane, cyclohexane and phenyl;

$X^1$ is a halogen group selected from fluoride, bromide and chloride;

the non-substituted $C_1$-$C_{10}$ linear or branched alkyl group or $C_1$-$C_{10}$ linear or branched alkyl group substituted with a $C_1$-$C_{10}$ linear or branched alkoxy group in $R^2$ is selected from the group consisting of methyl, ethyl, propyl, isopropyl, butyl, isobutyl, 2-[2-(2-methoxy-ethoxy)-ethoxy]-ethyl, cyclopentane, cyclohexane and phenyl; and $X^2$ is selected from the group consisting of fluoride, bromide, chloride, a fluoroalkyl group-substituted sulfonamide group, and a fluoroalkyl group-substituted sulfonamide group.

3. The electrolyte for a magnesium secondary battery according to claim 1, wherein the $R^1$—Mg—$X^1$ electrolyte salt is selected from the group consisting of ethyl magnesium bromide, ethyl magnesium chloride, All-Ethyl Complex (AEC, EtMgCl-(EtAlCl$_2$)$_2$ Complex), and All-Phenyl Complex (APC, PhMgCl—AlCl$_3$ Complex).

4. The electrolyte for a magnesium secondary battery according to claim 1, wherein

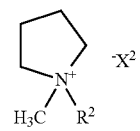

is selected from the group consisting of N-allyl-N-methylpyrrolidinium chloride, N-allyl-N-methylpyrrolidinium bromide, N-allyl-N-methylpyrrolidinium bis(trifluoromethane) sulfonamide, N-butyl-N-methylpyrrolidinium bromide, N-butyl-N-methylpyrrolidinium chloride, 1-{2-[2-(2-methoxy-ethoxy)-ethoxy]-ethyl}-1-methyl-pyrrolidinium bromide, and 1-{2-[2-(2-methoxy-ethoxy)-ethoxy]-ethyl}-1-methyl-pyrrolidinium chloride.

5. The electrolyte for a magnesium secondary battery according to claim 1, which comprises 1-20 wt % of the $R^1$—Mg—$X^1$ electrolyte salt, and 0.1-10 wt % of the compound represented by the formula of

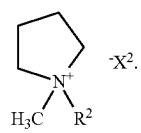

6. A method for preparing an electrolyte for a magnesium secondary battery, comprising the steps of:
(a) dissolving $R^1$—Mg—$X^1$ electrolyte salt into a solvent to provide a magnesium halide solution;
(b) dissolving an ionic liquid represented by the formula of

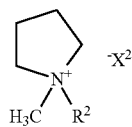

into a solvent to provide an additive solution; and
(c) adding the additive solution obtained from step (b) to the magnesium halide solution of step (a), followed by mixing, to provide an electrolyte for a magnesium secondary battery comprising the composition represented by the following Chemical Formula 1:

[Chemical Formula 1]

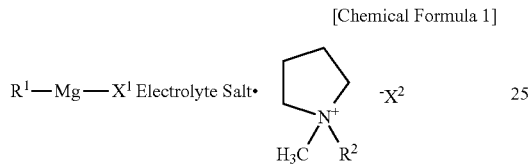

wherein $R^1$ is selected from the group consisting of a non-substituted $C_1$-$C_{10}$ linear or branched alkyl group or $C_1$-$C_{10}$ linear or branched alkyl group substituted with a $C_1$-$C_{10}$ linear or branched alkoxy group, non-substituted $C_5$-$C_{12}$ cycloalkyl group or $C_5$-$C_{12}$ cycloalkyl group substituted with a $C_1$-$C_{10}$ linear or branched alkoxy group, non-substituted $C_5$-$C_{12}$ aryl group or $C_5$-$C_{12}$ aryl group substituted with a $C_1$-$C_{10}$ linear or branched alkoxy group, and a non-substituted allyl group or allyl group substituted with a $C_1$-$C_{10}$ linear or branched alkoxy group;
$X^1$ is a halogen group;
$R^2$ is selected from the group consisting of a non-substituted $C_1$-$C_{10}$ linear or branched alkyl group or $C_1$-$C_{10}$ linear or branched alkyl group substituted with a $C_1$-$C_{10}$ linear or branched alkoxy group, non-substituted $C_5$-$C_{12}$ cycloalkyl group or $C_5$-$C_{12}$ cycloalkyl group substituted with a $C_1$-$C_{10}$ linear or branched alkoxy group, non-substituted $C_5$-$C_{12}$ aryl group or $C_5$-$C_{12}$ aryl group substituted with a $C_1$-$C_{10}$ linear or branched alkoxy group, and a non-substituted allyl group or allyl group substituted with a $C_1$-$C_{10}$ linear or branched alkoxy group; and
$X^2$ is selected from the group consisting of a halogen group, non-substituted or fluoroalkyl group-substituted sulfonamide group, and a non-substituted or fluoroalkyl group-substituted sulfonamide group.

7. The method for preparing an electrolyte for a magnesium secondary battery according to claim 6, wherein the $R^1$—Mg—$X^1$ electrolyte salt is selected from the group consisting of ethyl magnesium bromide, ethyl magnesium chloride, All-Ethyl Complex (AEC, EtMgCl-(EtAlCl$_2$)$_2$ Complex), and All-Phenyl Complex (APC, PhMgCl—AlCl$_3$ Complex);

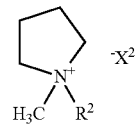

is selected from the group consisting of N-allyl-N-methylpyrrolidinium chloride, N-allyl-N-methylpyrrolidinium bromide, N-allyl-N-methylpyrrolidinium bis(trifluoromethane)sulfonamide, N-butyl-N-methylpyrrolidinium bromide, N-butyl-N-methylpyrrolidinium chloride, 1-{2-[2-(2-methoxy-ethoxy)-ethoxy]-ethyl}-1-methyl-pyrrolidinium bromide, and 1-{2-[2-(2-methoxy-ethoxy)-ethoxy]-ethyl}-1-methyl-pyrrolidinium chloride; and
step (c) is carried out by using 1-20 wt % of the $R^1$—Mg—$X^1$ electrolyte salt, and 0.1-10 wt % of the ionic liquid.

8. A magnesium secondary battery comprising the electrolyte for a magnesium secondary battery as defined in claim 1.

* * * * *